G. E. KELLAR.
IRRIGATING CONNECTION.
APPLICATION FILED OCT. 29, 1910.
1,016,159.
Patented Jan. 30, 1912.
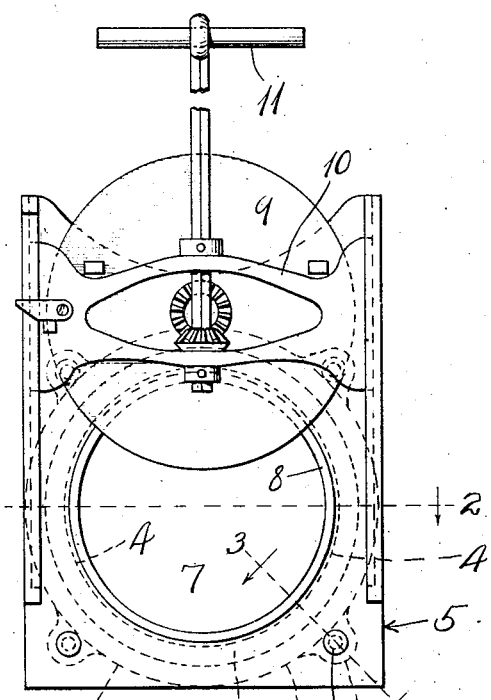
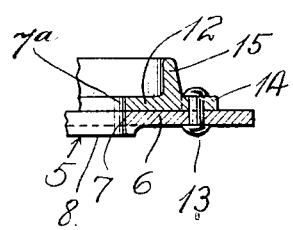
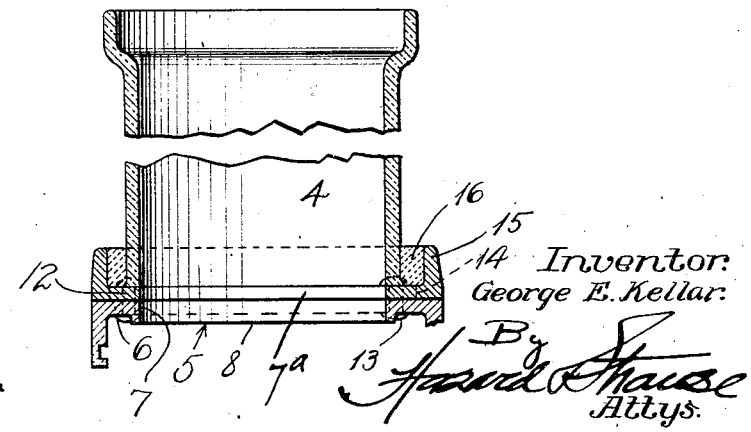
Witnesses.
E. R. Pollard
F. D. Ammen
Inventor:
George E. Kellar:
By
Attys.

UNITED STATES PATENT OFFICE.

GEORGE E. KELLAR, OF COVINA, CALIFORNIA, ASSIGNOR TO KELLAR-THOMASON MANUFACTURING COMPANY, OF COVINA, CALIFORNIA, A CORPORATION OF CALIFORNIA.

IRRIGATING CONNECTION.

1,016,159.  Specification of Letters Patent.  Patented Jan. 30, 1912.

Application filed October 29, 1910. Serial No. 589,653.

*To all whom it may concern:*

Be it known that I, GEORGE E. KELLAR, a citizen of the United States, residing at Covina, county of Los Angeles, State of California, have invented new and useful Improvements in Irrigating Connections, of which the following is a specification.

This invention relates to irrigating connections.

In irrigating systems pipes such as vitrified pipes are frequently used and on the end of the pipe a gate or valve is placed to control the flow of the water through the pipe. These pipes are of a simple form and constructed in sections so that the end of one section fits into the mouth of the next section. For this reason the end of the pipe is perfectly plain and of cylindrical form and on this account is not well adapted for attaching a gate or valve constructed of metal.

The object of this invention is to provide improved means for attaching a gate or valve to the end of such a pipe.

In the drawing forming a part of the annexed specification, Figure 1 is a front elevation of a gate which is attached to a pipe section in accordance with my invention. Fig. 2 is a horizontal section taken through the gate and through the pipe on the line 2—2 of Fig. 1, certain parts being broken away. Fig. 3 is a section taken on the line 3—3 of Fig. 1.

Referring more particularly to the parts 4 represents a section of vitrified pipe or similar pipe to the small end of which the gate 5 is attached. This gate 5 may be of any suitable construction comprising a face plate 6 having an opening 7 therethrough, around the edge of which a suitable seat 8 is formed for the disk 9 of the gate. This disk 9 is mounted on a slide 10 and is adapted to be operated by the handle 11 so as to come tightly upon the seat 8. The specific construction of the gate is immaterial for the purpose of this invention, however, except that the invention is applicable to gates having a face plate 6 as described.

In order to attach the gate to the pipe 4 I attach a ring 12 to the rear side of the face plate by means of suitable fastening devices or rivets 13 passing through lugs 14 provided on the ring for this purpose. This ring has an opening 7ª adapted to register with the opening 7 and at its outer edge the ring has an outwardly projecting flange or bead 15. The openings 7 and 7ª are of the same diameter as the inner diameter of the pipe.

In attaching the gate to the pipe the end of the pipe is placed against the outer face of the ring 12 so that the bore of the pipe registers with the openings 7 and 7ª. The annular flange 15 is of enlarged diameter so that an annular space is formed between the end of the pipe and the flange. With the pipe applied to the gate in this position I fill this annular space with a filler 16 of cement or a similar composition, which is adapted to set and harden in place. After this cement 16 hardens the gate will be found to be securely fastened to the pipe for the cement attaches itself to the outer surface of the pipe and the inner surface of the flange 15.

What I claim is:—

A gate having a plate with an opening through which water may flow, a pipe having its end abutting against said plate adjacent to said opening, said plate having an outwardly projecting flange encircling the end of said pipe and forming an annular space between the end of said pipe and said flange, and a cementitious filler in said annular space securing said plate to said pipe.

In witness that I claim the foregoing I have hereunto subscribed my name this 18th day of October, 1910.

GEORGE E. KELLAR.

Witnesses:
F. D. AMMEN,
EDMUND A. STRAUSE.